(12) United States Patent
Zha

(10) Patent No.: US 9,497,565 B1
(45) Date of Patent: Nov. 15, 2016

(54) INTERFACE DISPLAY METHOD, DEVICE, TERMINAL, SERVER AND SYSTEM

(71) Applicant: Tencent Technology (Shenzhen) Company Limited, Shenzhen, Guangdong (CN)

(72) Inventor: Wen Zha, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 15/102,843

(22) PCT Filed: Feb. 10, 2015

(86) PCT No.: PCT/CN2015/072614
§ 371 (c)(1),
(2) Date: Jun. 8, 2016

(87) PCT Pub. No.: WO2015/085966
PCT Pub. Date: Jun. 18, 2015

(30) Foreign Application Priority Data

Dec. 11, 2013 (CN) .......................... 2013 1 0674692

(51) Int. Cl.
*H04M 3/00* (2006.01)
*H04W 4/00* (2009.01)
(Continued)

(52) U.S. Cl.
CPC ......... *H04W 4/003* (2013.01); *H04M 1/72525* (2013.01); *H04W 8/183* (2013.01); *H04W 48/08* (2013.01)

(58) Field of Classification Search
CPC ........... H04W 8/245; H04M 1/72525; H04M 1/72522

USPC .......................... 455/418, 419, 414.1, 422.1
See application file for complete search history.

(56) References Cited

U.S. PATENT DOCUMENTS 8,520,848 B1    8/2013  Liu et al.
8,958,824 B2 *  2/2015  Yoon ................... G06F 17/3087
                                                    455/414.1
(Continued)

FOREIGN PATENT DOCUMENTS

CN    102387482 (A)    3/2012
CN    102404460 (A)    4/2012
(Continued)

OTHER PUBLICATIONS

International Search Report with Notification received in PCT Application No. PCT/CN2015/072614, mailed May 4, 2015.
(Continued)

*Primary Examiner* — Nghi H Ly
(74) *Attorney, Agent, or Firm* — Brinks Gilson & Lione

(57) ABSTRACT

Provided are an interface display method, device, terminal, server and system. The interface display method comprises: determining a first terminal and a second terminal currently using the same application with the same account; assigning to the first terminal and the second terminal respectively a permission of using at least one function interface provided by the application, the available function interfaces allocated to the first terminal and second terminal being at least partially different; determining the data associated with the available function interfaces of the first terminal and the second terminal respectively; and based on the available function interfaces of the first terminal and the second terminal, transmitting the data to the first terminal and the second terminal for display.

10 Claims, 11 Drawing Sheets

(51) Int. Cl.
*H04W 8/18* (2009.01)
*H04M 1/725* (2006.01)
*H04W 48/08* (2009.01)

(56) References Cited

U.S. PATENT DOCUMENTS

| | | |
|---|---|---|
| 2011/0131632 A1 | 6/2011 | Chang |
| 2011/0173589 A1 | 7/2011 | Guttman et al. |
| 2013/0290405 A1 | 10/2013 | Wong et al. |
| 2014/0006947 A1* | 1/2014 | Garmark .............. G06F 3/0484 715/716 |
| 2015/0063472 A1* | 3/2015 | Chatterton .......... H04L 63/0492 375/256 |

FOREIGN PATENT DOCUMENTS

| | | |
|---|---|---|
| CN | 102752407 (A) | 10/2012 |
| CN | 103377406 (A) | 10/2013 |
| CN | 104077123 (A) | 10/2014 |

OTHER PUBLICATIONS

Written Opinion of the International Searching Authority received in PCT Application No. PCT/CN2015/072614, mailed May 4, 2015.

* cited by examiner

INTERFACE DISPLAY METHOD, DEVICE, TERMINAL, SERVER AND SYSTEM

This application is a national phase of International Application No. PCT/CN2015/072614, titled "INTERFACE DISPLAY METHOD, DEVICE, TERMINAL AND SERVER", which claims priority to Chinese Patent Application No. 201310674692.3 titled "INTERFACE DISPLAY METHOD, DEVICE, TERMINAL AND SERVER" and filed with the Chinese State Intellectual Property Office on Dec. 11, 2013, both of which are incorporated herein by reference in entirety.

FIELD

The present disclosure relates to the technical field of mobile communications, and especially to a method for displaying an interface, an apparatus, a terminal and a server.

BACKGROUND

A user can open an application program and access functional interfaces provided by the application program. For example, the application program is microblog, and the user after logging in with a microblog account can access interfaces provided by microblog, such as a private message interface, a homepage interface and a game interface. And, in a case the user wants to send a private message to a friend while visiting a microblog homepage, the user can exit the microblog homepage and then enter the private message interface.

Since the application program may provide multiple functional interfaces, the user needs to operate a terminal to switch from a current functional interface to an interface to be accessed when the user wants to access the functional interface. However, in the switching process, the terminal needs to download related data from a server, thereby increasing a network traffic imperceptibly. In addition, when cross using different functional interfaces frequently, the user needs to operate the terminal to switch between different functional interfaces back and forth, thus an operational complexity for the user is high.

SUMMARY

In view of the above, a method for displaying an interface, an apparatus, a terminal, a server and a system are provided according to the present disclosure.

A method for displaying an interface is provided according to an embodiment of the present disclosure, which includes:
determining a first terminal and a second terminal, the first terminal and the second terminal currently running a same application program with a same account;
assigning respective access permission for accessing at least one functional interface provided by the application program to the first terminal and the second terminal, the assigned functional interface to the first terminal being distinct at least in part from the assigned functional interface assigned to the second terminal;
determining data related to the assigned functional interfaces of the first terminal and the second terminal; and
sending the data to the first terminal and the second terminal for displaying, the displaying based on the assigned functional interfaces of the first terminal and the second terminal.

A method for displaying an interface, applied in a first terminal, is provided according to an embodiment of the present disclosure, where the first terminal and a second terminal currently use an application program with one account. The method includes:
obtaining an access permission, assigned by a server, for accessing at least one functional interface provided by the application program, the assigned functional interface to the first terminal being distinct at least in part from the assigned functional interface to the second terminal;
receiving data related to the assigned functional interface of the first terminal from the server; and
displaying the assigned functional interface based on the data.

A server is provided according to an embodiment of the present disclosure. The server includes:
a terminal determining module, configured to determine a first terminal and a second terminal currently running a same application program with a same account;
a permission assigning module, configured to assign respective access permission for accessing at least one functional interface provided by the application program to the first terminal and the second terminal, the assigned functional interface to the first terminal being distinct at least in part from the assigned functional interface to the second terminal;
a data determining module, configured to determine data related to the assigned functional interfaces of the first terminal and the second terminal; and
a data sending module, configured to send the data to the first terminal and the second terminal for display, the displaying based on the assigned functional interfaces of the first terminal and the second terminal.

An apparatus for displaying an interface, applied in a first terminal, is provided according to an embodiment of the present disclosure, where the first terminal and a second terminal currently use an application program with one account. The apparatus includes:
a permission obtaining module, configured to obtain an access permission, assigned by a server, for accessing at least one functional interface provided by the application program, the assigned functional interface to the first terminal being distinct at least in part from the assigned functional interface to the second terminal;
a data receiving module, configured to receive data related to the assigned functional interface of the first terminal from the server; and
an interface displaying module, configured to display the assigned functional interface based on the data.

A terminal, which includes the apparatus for displaying an interface according to any of the foregoing possible implementations, is provided according to an embodiment of the present disclosure.

A system for displaying an interface, which includes the server according to any of the foregoing possible implementations and at least two terminals according to any of the foregoing possible implementations, is provided according to an embodiment of the present disclosure.

According to the embodiments of the invention, access permissions for different functional interfaces are assigned to terminals which simultaneously use an application program with one account, and data corresponding to each of the functional interfaces is only assigned to a terminal having a access permission for the functional interface, instead of assigning the data corresponding to each of the functional interfaces to all the terminals using the application program, thus solving the problem that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has a access permission, rather than receives data corresponding to all the functional interfaces provided by the application program, a user can directly view a functional interface in a terminal having a access permission therefor when accessing the functional interface without frequent switching operations, thus reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

BRIEF DESCRIPTION OF THE DRAWINGS

The drawings to be used in the descriptions of embodiments are described briefly as follows, so that technical solutions according to the embodiments of the invention may become clearer. Apparently, the drawings in the following descriptions only illustrate some embodiments of the invention. For those in the art, other drawings may be obtained based on these drawings without any creative work.

DETAILED DESCRIPTION

The invention is further described hereinafter in conjunction with the drawings, so that the objective, technical solutions and advantages of the invention may be become clearer. Apparently, the described embodiments are only a part rather than all of the embodiments of the invention. Any other embodiments obtained by those skilled in the art based on the embodiments according to the present disclosure without any creative work fall in the scope of the invention.

For understanding, the implementation environment involved in the embodiments according to the present disclosure is described first in detail.

With the improvement of living standard of people, a person usually has multiple terminals with a display screen, such as a cellphone, a laptop computer and a desktop computer. In order to fulfill the demand of people of running an application program in different terminals, for more and more application programs, versions corresponding to different platforms are developed.

Figure 1:
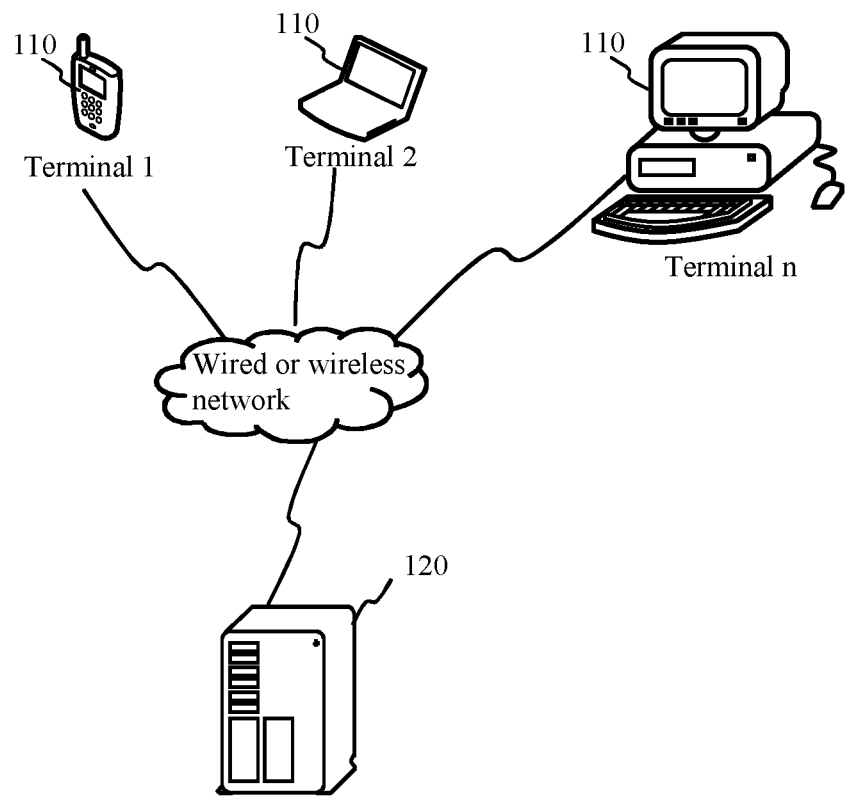
FIG. 1 is a structural diagram of an implementation environment according to the present disclosure.

Based on functions of the application program above, the implementation environment involved in the embodiments according to the present disclosure is that a user runs an application program with the same account through two or more terminals simultaneously. At least two terminals 110, which run an application program with the same account simultaneously, and a server 120 may be included in the implementation environment, as is shown in FIG. 1.

Each of the at least two terminals 110 may be a cellphone, a tablet computer, an e-book reader, a laptop computer and a desktop computer. The at least two terminals 110 may be connected with the server 120 through a wired network or a wireless network, such that the each of the at least two terminals 110 can send a request for running an application program to the server 120, receive a access permission for accessing at least one functional interface provided by the application program assigned by the server 120, and receive data corresponding to the functional interface sent from the server 120.

The server 120 may be connected to each of the at least two terminals 110 through a wired network or a wireless network, such that the server can receive a use of an application of each of the at least two terminals 110, assign a access permission for accessing at least one functional interface provided by the application program to each of the at least two terminals 110 and send data corresponding to the functional interface to a terminal 110 having the access permission for accessing the functional interface.

Figure 2A:
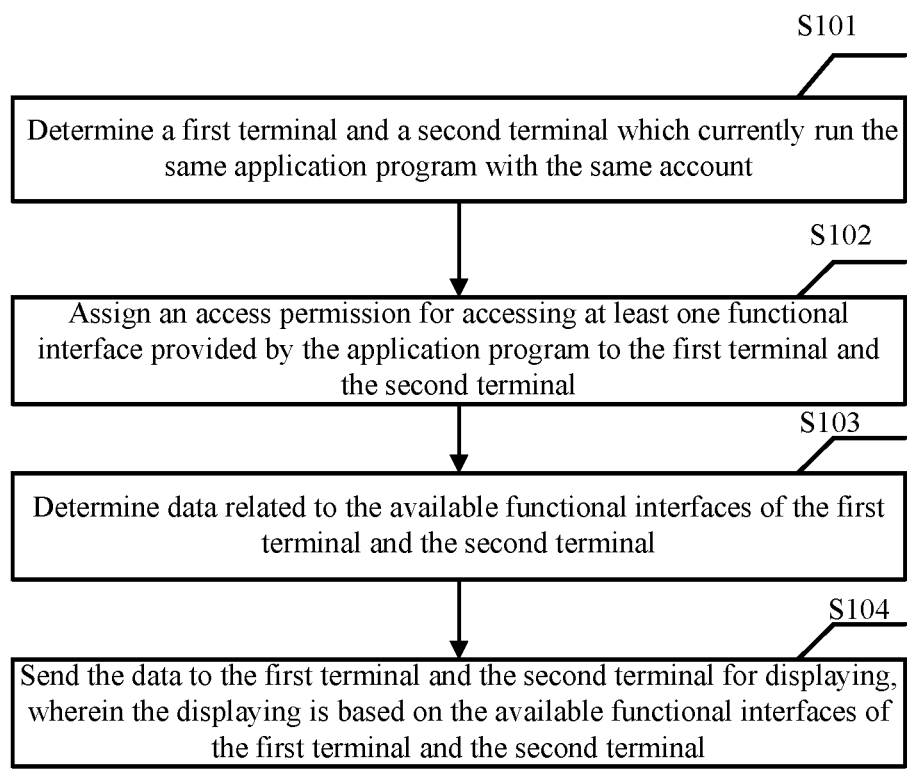
FIG. 2A is a flowchart of a method for displaying an interface according to an embodiment of the invention.

As shown in FIG. 2A, a method for displaying an interface is provided according to an embodiment of the invention, which includes steps S101 to S104.

In step S101, a first terminal and a second terminal which currently run the same application program with the same account are determined.

In step S102, an access permission for accessing at least one functional interface provided by the application program is assigned to each of the first terminal and the second terminal, where an available functional interface assigned to the first terminal is distinct at least in part from that assigned to the second terminal.

Here, the "available" means that an access permission for accessing the functional interface is assigned to a terminal by a server so that the terminal can access the functional interface.

In step S103, data related to the available functional interface of the first terminal and that of the second terminal is determined.

In step S104, the data is sent to the first terminal and the second terminal for display, based on the available functional interface of the first terminal and that of the second terminal.

According to an embodiment of the invention, the method may further include: receiving update data of the application program, determining a functional interface related to the update data, and sending the update data to a terminal having an access permission for accessing the related functional interface.

First Embodiment

Figure 2B:
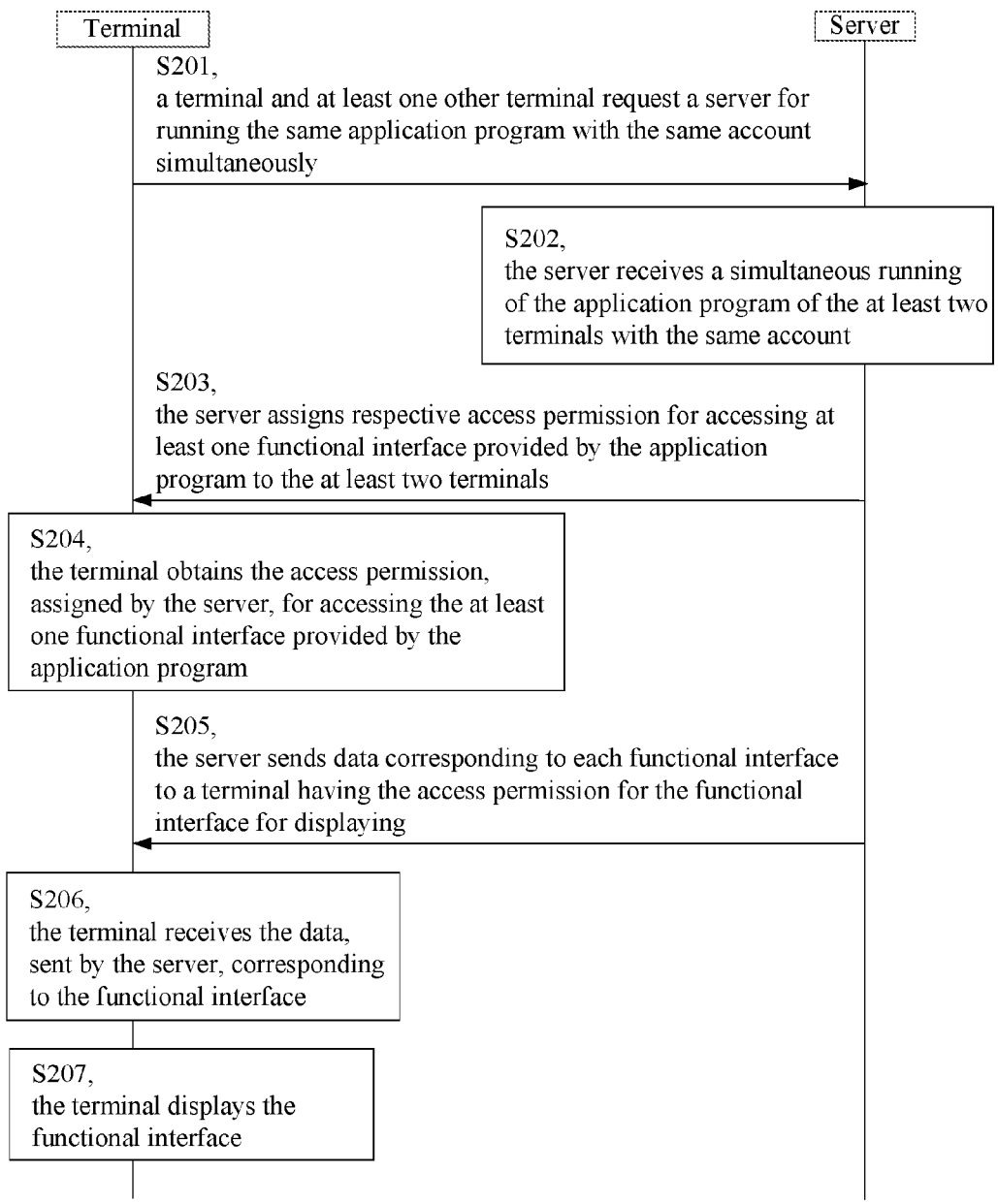
FIG. 2B is a flowchart of a method for displaying an interface according to a first embodiment of the invention.

Reference is made to FIG. 2B, which shows a flowchart of a method for displaying an interface according to the first embodiment of the invention. In the embodiment, the method for displaying an interface is applied in the implementation environment shown in FIG. 1, for example. The method for displaying an interface may include steps 201 to 207.

In step 201, at least two terminals run the same application program with the same account simultaneously.

In step 202, a server receives the simultaneous running of the same application program of the at least two terminals with the same account.

In step 203, the server assigns respective access permission for accessing at least one functional interface provided by the application program to the at least two terminals.

A functional interface assigned to a current terminal of the at least two terminals is distinct from a functional interface assigned to any other of the at least two terminals.

In step 204, each of the at least two terminals obtains the access permission, assigned by the server, for accessing the at least one functional interface provided by the application program.

The at least one functional interface is distinct from a functional interface assigned to any other of the at least two terminals.

In step 205, the server sends data corresponding to each functional interface to the terminal having the access permission for accessing the functional interface for display.

In step 206, the terminal receives the data corresponding to the functional interface, where the data corresponding to the functional interface is sent by the server to the terminal having the access permission for accessing the functional interface.

In step 207, the terminal displays the functional interface.

In summary, in the method for displaying an interface according to the embodiment, access permissions for accessing different functional interfaces are assigned to terminals which simultaneously run the same application program with the same account, and data corresponding to each of the functional interfaces is only assigned to a terminal having an access permission for accessing the functional interface, instead of assigning the data corresponding to each of the functional interfaces to all the terminals running the application program, thereby addressing the issue that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has an access permission, rather than receives data corresponding to all the functional interfaces provided by the application program, and thus a user can directly view a functional interface in a terminal having an access permission therefore without frequent switching operations, thus reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

It should be noted that the method for assigning the access permission may be varied. The server may assign the access permission for accessing the at least one functional interface provided by the application program to a terminal automatically. Alternatively, a terminal sends to the server a request for applying for the access permission for accessing the at least one functional interface for itself, and the terminal assigns the access permission for accessing the at least one functional interface to the terminal. Or, another terminal which shares the same account with the terminal sends to the server a request for applying for the access permission for accessing the at least one functional interface for the terminal, and the server assigns the access permission for accessing the at least one functional interface to the terminal. And the three cases above are described in detail hereinafter in different embodiments.

Figure 3A:
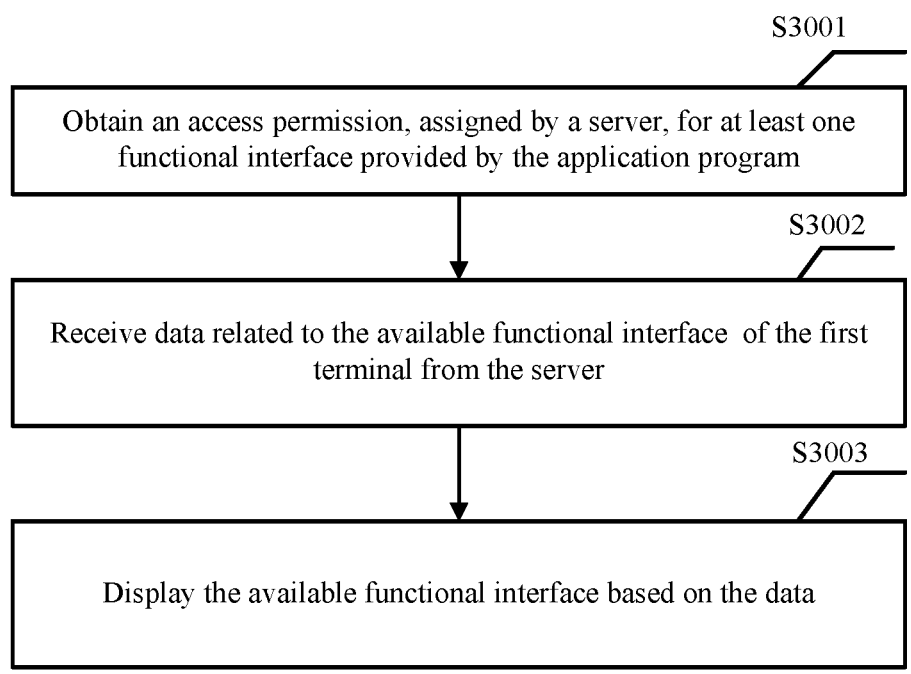
FIG. 3A is a flowchart of a method for displaying an interface according to an embodiment of the invention.

FIG. 3A illustrates a method for displaying an interface according to an embodiment of the invention applied in a first terminal. The first terminal and a second terminal currently run the same application program with the same account. The method includes steps S3001 to S3003.

In step S3001, an access permission, assigned by a server, for accessing at least one functional interface provided by the application program is obtained, where the available functional interface assigned to the first terminal is distinct at least in part from that assigned to the second terminal.

In step S3002, data related to the available functional interface of the first terminal is received from the server.

In step S3003, the functional interface is displayed based on the data.

Second Embodiment

Figure 3B:
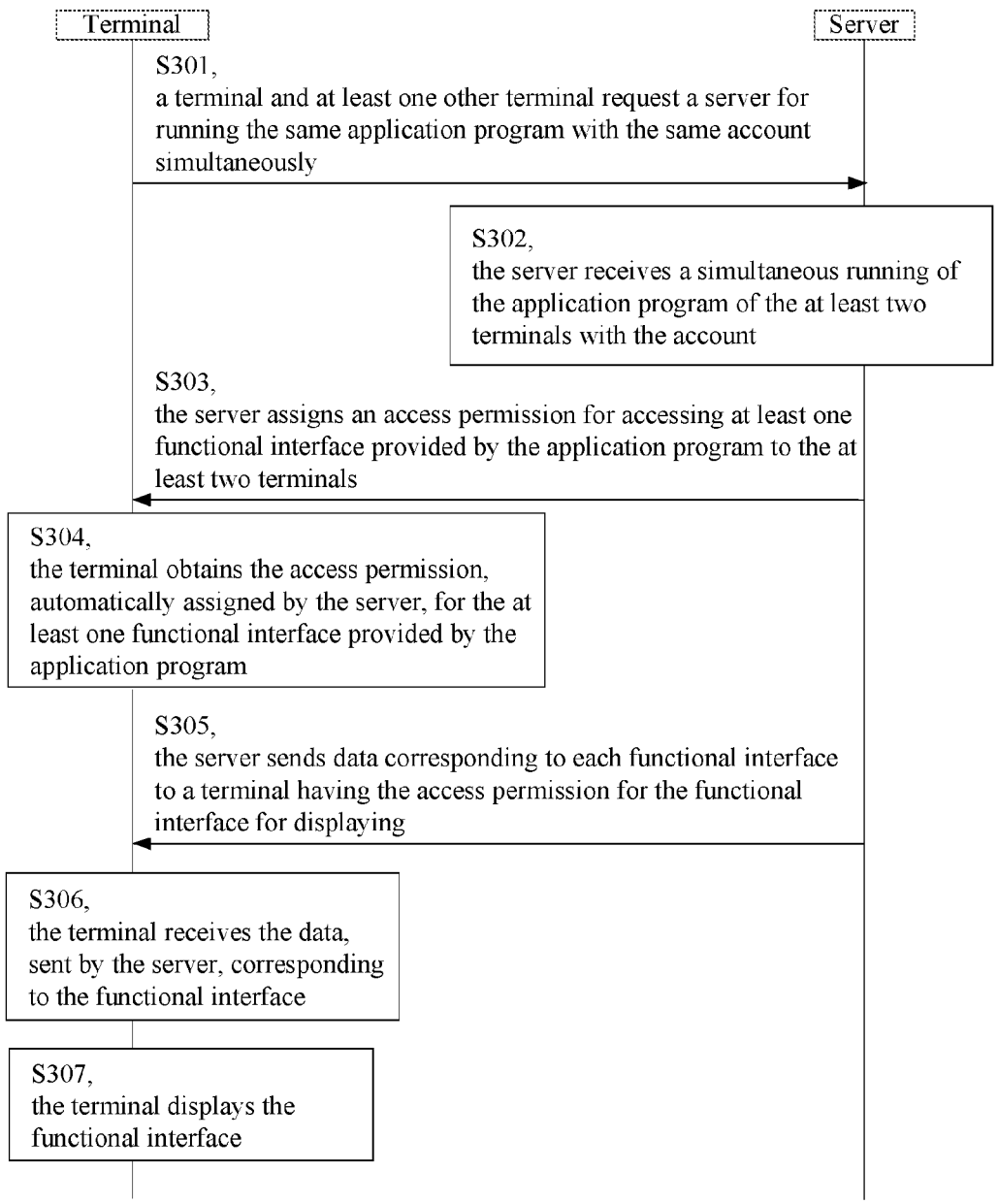
FIG. 3B is a flowchart of a method for displaying an interface according to a second embodiment of the invention.

Reference is made to FIG. 3B, which shows a flowchart of a method for displaying an interface according to the second embodiment of the invention. In the embodiment, the method for displaying an interface is applied in the implementation environment shown in FIG. 1 and a server assigns an access permission for accessing at least one functional interface to a terminal automatically, for example. The method for displaying an interface includes steps 301 to 307.

In step 301, a terminal and at least one other terminal simultaneously request a server for running the same application program with the same account.

A user may request a server corresponding to an application program for running the application program with an account in a terminal. In practical implementations, in a case the user has multiple terminals, the user may request the server for running an application program with one account in at least two terminals simultaneously. For example, in a case the application program is microblog and the user has a cellphone, a laptop computer and a desktop computer, the user may login to microblog in the laptop computer, the cellphone and the desktop computer with one microblog account.

In step 302, the server receives a simultaneous running of the application program of the at least two terminals with the same account.

Correspondingly, the server may receive a simultaneous running of the application program of the at least two terminals with the same account.

In step 303, the server assigns an access permission for accessing at least one functional interface provided by the application program to the at least two terminals automatically.

In a case at least two terminals request running the same application program with the same account simultaneously, the server may assign an access permission for accessing at least one functional interface provided by the application program to each of the at least two terminals automatically. And a functional interface assigned to a current terminal is distinct from that assigned to any other of the at least two terminals.

A method for the server to assign the access permission for accessing the at least one functional interface provided by the application program to each of the at least two terminals automatically may include any of the four following methods.

The first one includes automatically assigning an access permission for accessing a predetermined functional interface to the at least two terminals.

In a first possible implementation, the server may automatically assign an access permission for accessing a predetermined functional interface to the at least two terminals. In a case at least two terminals run the same application program with the same account, the server may assign an access permission for accessing at least one functional interface to each of the at least two terminals in a predetermined assigning rule. The assigning rule may include assigning an access permission for accessing at least one functional interface to each terminal in chronological order of when the at least two terminals sharing the same account request running the application program.

For example, microblog may provide a homepage functional interface, a private message functional interface and a game functional interface. The server, on receiving that the cellphone logs in to microblog with the same account, may assign an access permission for accessing the homepage interface to a laptop computer which has logged in to microblog and assign an access permission for accessing the private message interface to a cellphone which logs in to microblog. Similarly, when a desktop computer logs in to microblog with the same account, the server may assign an access permission for accessing the game interface to the desktop computer. In practical implementations, the server may rank the at least one functional interface provided by the application program by priority, and assign a functional interface with a highest priority to a terminal, which requests accessing the application program first, among the at least two terminals sharing the same account, which is not limited in the embodiment.

It should be noted that in the embodiment, automatically assigning the access permission for accessing the at least one functional interface to each of the at least two terminals in the predetermined assigning rule is only taken as example. In an alternative practical implementations, the server may automatically assign an access permission for accessing a predetermined functional interface to the at least two terminals in any other assigning rule, which is not limited in the embodiment. For example, the assigning rule may further include assigning an access permission for accessing a functional interface suitable for each of the at least two terminals to display and use based on a screen size and an operation mode of each of the at least two terminals.

The second one includes automatically assigning an access permission for which each of the at least two terminals applied last time, for a functional interface to each of the at least two terminals.

In a second possible implementation, the server may automatically assign an access permission for which each of the at least two terminals applied last time, for a functional interface to each of the at least two terminals. Specifically, since each of the at least two terminals may apply for an access permission for accessing a functional interface, in a case a terminal releases the access permission for accessing the functional interface that has been applied for and the server needs to assign an access permission for accessing the functional interface to the terminal again, the server may obtain the access permission for accessing the functional interface that is applied for last time by the terminal and automatically assign this access permission to the terminal. For example, the user logs in to microblog through a cellphone, and requests an access permission for accessing the private message interface, and logs out. In a case the user logs in to microblog through the cellphone again, the server may assign the access permission for accessing the private message interface to the cellphone.

The third one includes automatically assigning a most time access permission for accessing a functional interface to the at least two terminals.

In a third possible implementation, the server may automatically assign a most time access permission for accessing a functional interface to each of the at least two terminals. Specifically, when needing to assign an access permission for accessing a functional interface to a terminal, the server may first obtain access permissions of accessing functional interfaces that have been ever used by the terminal. If a functional interface is most used by the terminal, it indicates that the user prefers to view the functional interface in this terminal. In this case, the server may assign the most time access permission for accessing the functional interface to the terminal.

The fourth one includes assigning an access permission for accessing a functional interface which has not been applied for by any other terminal, to a terminal, in a case the terminal is a default terminal.

In a fourth possible implementation, the server may assign an access permission for accessing a functional interface which has not been applied for by any other terminal, to a terminal, in a case the terminal is a default terminal. Specifically, since the application program can provide at least one functional interface, access permissions for accessing some functional interfaces may probably not be assigned to any terminal after the server assigns access permissions for accessing functional interfaces to other terminals accessing the application program. In order to ensure that each functional interface provided by the application program can be displayed in at least one of the terminals accessing the application program, the server may assign an access permission for accessing a functional interface, which has not been applied for by any other terminal, to a terminal in a case the terminal is a default terminal. The default terminal may be a terminal which has not initiatively applied for an access permission for accessing any functional interface, or a terminal pre-marked by a user, which is not limited in the embodiment.

For example, in a case the user has simultaneously logged in to microblog in a cellphone, a laptop computer and a desktop computer and sets the desktop computer as the default terminal, the server can assign an access permission for accessing a functional interface which has not been applied for by the cellphone and the laptop computer to the desktop computer when assigning an access permission for accessing a functional interface to the desktop computer.

Similarly, in a case a terminal has not initiatively applied for an access permission for accessing any functional interface, the server when assigning an access permission to the terminal may assign an access permission for accessing a functional interface for which has not been applied by any other terminal to this terminal. In a particular example, in a case the user applies for an access permission for accessing the private message interface through the cellphone, applies for a user permission for the homepage interface through the laptop computer but does not apply for an access permission for accessing any functional interface through the desktop computer, the server may assign an access permission for any functional interface, except the private message interface and the homepage interface, of the at least one functional interface provided by the application program to the desktop computer.

It should be noted that the terminal sends a login request to the server with an account first when applying for accessing the application program, i.e., the server can receive a login request sent by each terminal. Thus, in practical implementations, in order that the user can view different functional interfaces in different terminals, the server may automatically assign an access permission for accessing at least one functional interface, such as a functional interface that the terminal applies for the last time logging and a most time functional interface for the terminal in history, to each terminal which has successfully logged in, after receiving the login request sent by each terminal. Indeed, in practical implementations, after receiving the login request sent by each terminal, the server may assign an access permission for accessing a main interface to each terminal, i.e., the server assigns the access permission for accessing the main interface to multiple terminals simultaneously, and an access permission for accessing any other application interface can only be assigned to one terminal at one time point, so that each terminal can display the main interface first. Then the server can assign an access permission for accessing at least one functional interface to each terminal in the above predetermined assigning rule, which is not limited in the embodiment.

In step 304, each of the at least two terminals receives the access permission, automatically assigned by the server, for accessing the at least one functional interface provided by the application program.

After the server automatically assigns the access permission for accessing the at least one functional interface provided by the application program to each of the at least two terminals, each of the at least two terminals can correspondingly receive the at least one functional interface provided by the application program, which is automatically assigned by the server. The at least one functional interface assigned to a current terminal is distinct from that assigned by the server to any other terminal. Since the method for the server to automatically assign the access permission for accessing the at least one functional interface to each of the at least two terminals is varied, a method for each of the at least two terminals to receive the user permission, automatically assigned by the server, for the at least one functional interface is also varied, which, in practical implementations, may include any of the four following method.

The first one includes receiving an access permission, automatically assigned by the server, for accessing a predetermined functional interface.

In a first possible implementation, in a case the server automatically assigns an access permission for accessing a predetermined functional interface to a terminal, the terminal may correspondingly receive the access permission, automatically assigned by the server, for the predetermined functional interface.

The second one includes receiving an access permission automatically assigned by the server, which is applied for by each of the at least two terminals last time and, for a functional interface.

In a second possible implementation, in a case the server automatically assigns an access permission, for which each of the at least two terminals applied last time, for a functional interface to each of the at least two terminals, each of the at least two terminals may receive the access permission automatically assigned by the server, for which each of the at least two terminals applied last time and, for the functional interface.

The third one includes receiving a most time access permission automatically assigned by the server for accessing a functional interface.

In a third possible implementation, in a case the server automatically assigns a most time access permission for accessing a functional interface, the terminal may correspondingly receive the access permission assigned by the server for accessing the functional interface.

The fourth one includes receiving an access permission assigned by the server for accessing a functional interface which has not been applied for by any other terminal, in a case the terminal is a default terminal.

In a fourth possible implementation, in a case the terminal is a default terminal and the server automatically assigns an access permission for accessing a functional interface which has not been applied for by any other terminal, to the terminal, the terminal may receive the access permission assigned by the server for accessing the functional interface which has not been applied for by any other terminal.

In step 305, the server sends data corresponding to each functional interface to a terminal having an access permission for accessing the functional interface for display.

After assigning the access permission for accessing the at least one functional interface to each of the at least two terminals, the server may send data corresponding to each functional interface to a terminal having an access permission for accessing the functional interface for display. For example, the server assigns the access permission for accessing the private message interface to the cellphone, assigns an access permission for the homepage interface to the laptop computer and assigns access permissions for accessing the other functional interfaces provided by microblog to the desktop computer, the server may send a private message only to the cellphone without sending the private message to the laptop computer or the desktop computer when needing to sending the private message to a terminal logging in with the account. Since the private message is sent only to the cellphone having the access permission and is not sent to the laptop computer or the desktop computer, disturbance brought in to the laptop computer and the desktop computer when the private message arrives at the laptop computer and the desktop computer can be avoided. In addition, since the server sends the data to a terminal having an access permission for accessing a corresponding functional interface, the problem that the consumption of network traffic of each terminal is large in a case one message is sent to multiple terminals can be avoided.

In step 306, the terminal receives the data corresponding to the functional interface.

After the server sends the data corresponding to the functional interface to the terminal having the access permission for accessing the functional interface, the terminal may receive the data corresponding to the functional interface sent by the server. The data corresponding to the functional interface is sent to the terminal having the access permission for accessing the functional interface by the server.

In step 307, the terminal displays the functional interface.

After receiving the data corresponding to the functional interface sent by the server, the terminal may display the functional interface. For example, in a case the cellphone receives a private message sent by the server, the cellphone may display the private message interface. Since a terminal only receives the data corresponding to the functional interface for which the terminal has the access permission, without receiving data corresponding to all functional interfaces provided by the application program, the network traffic consumed by the terminal can be greatly reduced. In addition, the terminal only displays the functional interface for which the terminal has the access permission without displaying all the functional interfaces, such that when the user needs to view a specified functional interface, the user may directly view the specified functional interface in a terminal having an access permission with no need of switching between interfaces in the terminal, thereby simplifying operations for the user.

The step that the terminal displays the functional interface may include at least one of the two following steps.

The first step includes displaying the functional interface in which data irrelevant to the functional interface has been filtered out.

In a first possible implementation, in order that only data of interest to the user is included in the functional interface displayed in the terminal, the terminal may if needed display the functional interface in which data irrelevant to the functional interface has been filtered out. The data irrelevant to the functional interface may be an advertisement in the functional interface or data for guiding the user to another functional interface. For example, in a case the data irrelevant to the functional interface is an advertisement, in order to prevent the advertisement from disturbing the user and thus improve the user experience, the terminal may display the functional interface in which the advertisement has been filtered out.

The second step includes displaying the functional interface which has been zoomed in by a predetermined scale.

In a second possible implementation, for ease of viewing of the user, the terminal may display the functional interface which has been zoomed in by a predetermined scale.

It should be noted that in order to reduce the occupation of resources of the terminal, the terminal may only start sensors relevant to the functional interface without starting sensors irrelevant to the functional interface. In deed, in practical implementations, the terminal may adaptively display the functional interface in other ways, such as playing a sound and transforming the functional interface, which are not described here redundantly.

In summary, in the method for displaying an interface according to the embodiment, access permissions for accessing different functional interfaces are assigned to terminals which simultaneously running the same application program with the same account, and data corresponding to each of the functional interfaces is only assigned to a terminal having an access permission for accessing the functional interface, instead of assigning the data corresponding to each of the functional interfaces to all the terminals accessing the application program, thus addressing the issue that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminals only receives data corresponding to a part of the functional interfaces, for which the terminal has an access permission, rather than receives data corresponding to all the functional interfaces provided by the application program, a user can directly view a functional interface in a terminal having an access permission therefore when accessing the functional interface without frequent switching operations, thus reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

In the embodiment, the server automatically assigns the access permission for accessing the at least one functional interface to the terminals, further reducing the operational complexity for the user and improving the user experience.

In addition, according to the embodiment, the functional interface may be displayed adaptively when being displayed, achieving the effect that the user can view the contents in the functional interface more conveniently.

Third Embodiment

Figure 4A:
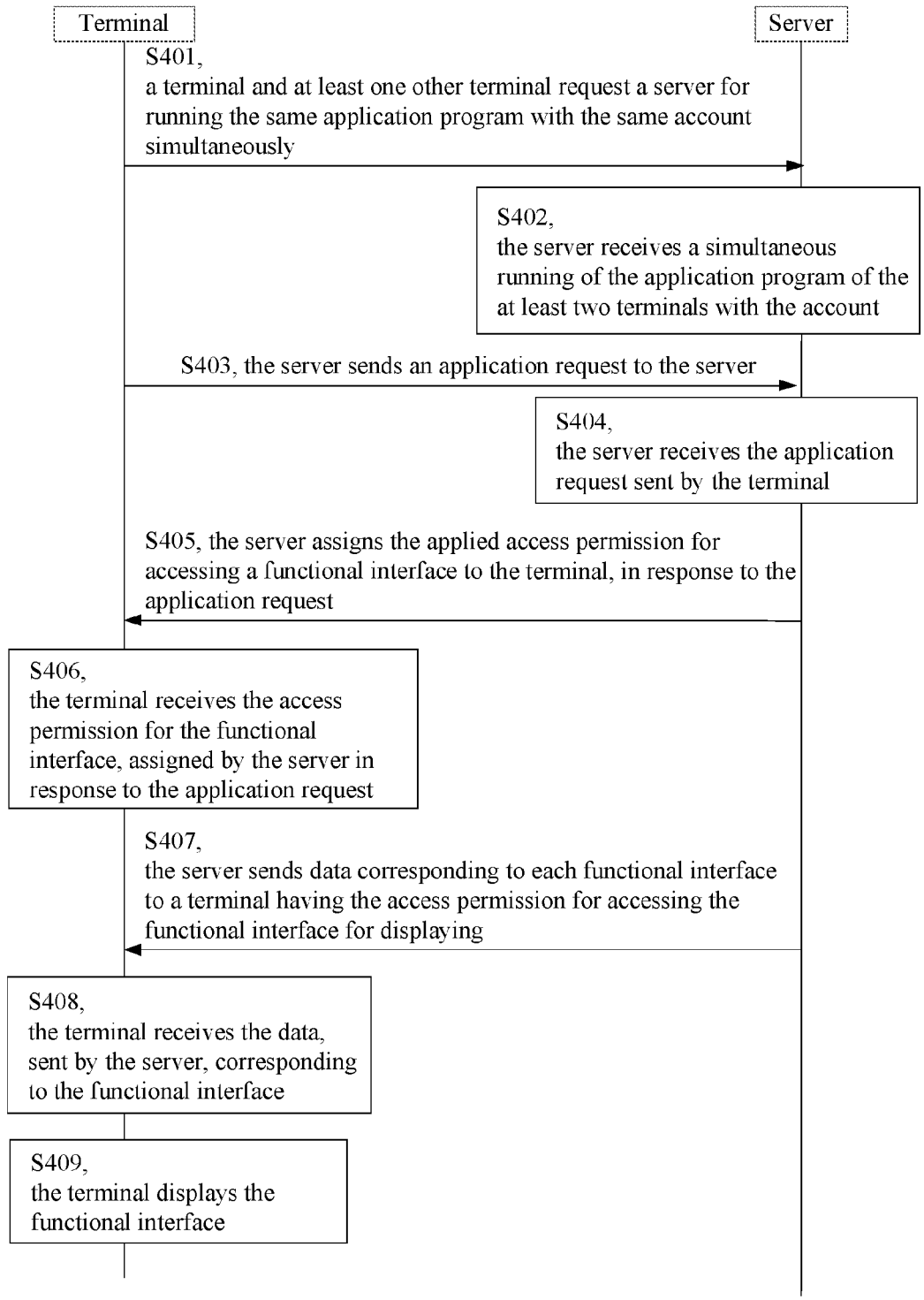
FIG. 4A is a flowchart of a method for displaying an interface according to a third embodiment of the invention.

Reference is made to FIG. 4A, which shows a flowchart of a method for displaying an interface according to the third embodiment of the invention. In the embodiment, the method for displaying an interface is applied in the implementation environment shown in FIG. 1, for example. In the embodiment, a terminal first sends an application request for applying for an access permission for accessing at least one functional interface provided by an application program for the terminal itself, and a server assigns the access permission for accessing the at least one functional interface to the terminal in response to the application request, for example. The method for displaying an interface may include steps 401 to 409.

In step 401, a terminal and at least one other terminal simultaneously request a server for running the same application program with the same account.

A user can request a server corresponding to an application program for running the application program with an account in a terminal. In practical implementations, in a case the user has multiple terminals, the user can request the server for running an application program with the same account in at least two terminals simultaneously. For example, in a case the application program is microblog and the user has a cellphone, a laptop computer and a desktop computer, the user can login to microblog in the laptop computer, cellphone and desktop computer with one microblog account.

In step 402, the server receives a simultaneous running of the application program of the at least two terminals with the same account.

Correspondingly, the server may receive a simultaneous running of the application program of the at least two terminals with the one account.

In step 403, the terminal sends an application request to the server.

In a case the terminal and at least one other terminal simultaneously run the application program with the same account, the terminal may send an application request to the server. The application request is used to apply for an access permission for accessing at least one functional interface for the terminal.

For example, in a case the user logs in to microblog in the cellphone, the laptop computer and the desktop computer simultaneously, and in order to only display a private message interface in the cellphone and thus facilitate viewing a private message for the user, the user may send an application request for applying for an access permission for accessing the private message interface to the server through the cellphone.

The terminal may be triggered by the user manually to send the application request or the application program may automatically trigger, through software, sending the application request, thus the step that the terminal sends the application request to the server may include any of the two following steps.

A first step includes receiving a trigger signal for triggering applying for the access permission for accessing the at least one functional interface, and sending the application request to the server after receiving the trigger signal.

In a first possible implementation, in a case the terminal and the at least one other terminal run the application program with the same account simultaneously, the terminal may receive a trigger signal for triggering applying for the access permission for accessing the at least one functional interface, and send the application request to the server after receiving the trigger signal. For example, in a case the user logs in to microblog through the cellphone, the user may exert a trigger signal for triggering applying for the access permission for accessing the private message interface when the user only wants the private message interface to be displayed in the cellphone. After receiving the trigger signal, the cellphone may send the application request for applying for the access permission for accessing the private message interface to the server.

A second step includes automatically sending an application request to the server in a case the terminal displays one of the at least one functional interface.

In a second possible implementation, in a case the terminal and the at least one other terminal run the application program with the same account simultaneously and the user operates the terminal to make the terminal keep displaying a certain functional interface, the terminal may automatically send an application request to the server. For example, after logging in to microblog through the cellphone, the user may operate the cellphone to make the cellphone keep displaying the private message interface, and then the terminal may automatically send the application request to the server. Indeed, in practical implementations, the terminal may send the application request to the server after displaying the functional interface for a predetermined time, which is not limited in the embodiment.

In step 404, the server receives the application request sent by the terminal.

After the terminal sends the application request to the server, the server may receive the application request sent by the terminal accordingly.

In step 405, the server assigns the applied access permission for accessing the at least one functional interface to the terminal, in response to the application request.

After receiving the application request sent by the terminal, the server may assign the applied access permission for accessing the at least one functional interface to the terminal, in response to the application request. For example, in a case the server receives an application request sent by the cellphone for applying for the access permission for accessing the private message interface, the server may assign the access permission for accessing the private message interface to the cellphone.

It should be noted that a conventional method for a terminal to apply for running an application program includes the following. The terminals each send a login request to the server, the server returns contents in a main interface to each terminal after receiving the login request, and the user performs a certain operation on the main interface to guide the terminal to each functional interface after the terminal displays the contents in the main interface. The server may assign an access permission for accessing the main interface to multiple terminals simultaneously when the terminals are running the application program. After receiving the application requests sent by the terminals, the server assigns the access permissions, applied for through the application requests, for the at least one functional interface to the terminals, and the access permission for accessing one functional interface is only assigned to one terminal at a specific time, which is not redundantly described in the embodiment.

In step 406, the terminal receives the access permission for accessing the at least one functional interface which is assigned by the server, in response to the application request.

Correspondingly, the terminal may receive the access permission for accessing the at least one functional interface which is assigned by the server, in response to the application request.

In step 407, the server sends data corresponding to each functional interface to the terminal having the access permission for accessing the functional interface.

After assigning the access permission for accessing at least one functional interface to each terminal, the server may send data corresponding to each functional interface to a terminal having an access permission for accessing the functional interface for display. For example, in a case the server assigns the access permission for accessing the private message interface to the cellphone, assigns an access permission for accessing a homepage interface to the laptop computer and assigns access permissions for accessing the other functional interfaces provided by microblog to the desktop computer, the server may if needed send a private message only to the cellphone without sending the private message to the laptop computer or the desktop computer. Since the private message is sent only to the cellphone having the access permission but is not sent to the laptop computer or the desktop computer, disturbance brought in to the laptop computer and the desktop computer when the private message arrives at the laptop computer and the desktop computer can be avoided. In addition, since the server sends the data to the terminal having an access permission for accessing a corresponding functional interface, the problem that the consumption of network traffic of each terminal is large in a case one message is sent to multiple terminals can be avoided.

In step 408, the terminal receives the data corresponding to the functional interface, where the data corresponding to the functional interface is sent to the terminal having the access permission for accessing the functional interface by the server.

After the server sends the data corresponding to the functional interface to the terminal having the access permission for accessing the functional interface, the terminal may receive the data corresponding to the functional interface sent by the server, where the data corresponding to the functional interface is sent to the terminal having the access permission for accessing the functional interface by the server.

In step 409, the terminal displays the functional interface.

After receiving the data corresponding to the functional interface sent by the server, the terminal may display the functional interface. For example, in a case the cellphone receives a private message sent by the server, the cellphone can display the private message interface. Since the terminal only receives the data corresponding to the functional interface for which the terminal has the access permission without receiving data corresponding to all functional interfaces provided by the application program, the network traffic consumed by the terminal can be greatly reduced. In addition, the terminal only displays the functional interface for which the terminal has the access permission without displaying all the functional interfaces, so that when the user needs to view a specified functional interface, the user can directly view the specified functional interface in the terminal having the access permission without switching between interfaces in the terminal, simplifying operations for the user.

The step that the terminal displays the functional interface may include at least one of the two following steps.

A first step includes displaying the functional interface in which data irrelevant to the functional interface has been filtered out.

In a first possible implementation, in order that only data of interest to the user is included in the functional interface displayed in the terminal, the terminal may display the functional interface in which data irrelevant to the functional interface has been filtered out. The data irrelevant to the functional interface may be an advertisement in the functional interface or data for guiding the user to another functional interface. For example, in a case the data irrelevant to the functional interface is an advertisement, in order to prevent the advertisement from disturbing the user and thus improve the user experience, the terminal may display the functional interface in which the advertisement has been filtered out when displaying the functional interface.

A second step includes displaying the functional interface which has been zoomed in by a predetermined scale.

In a second possible implementation, for ease of viewing of the user, the terminal may display the functional interface which has been zoomed in by a predetermined scale when displaying the functional interface.

It should be noted that in order to reduce the occupation of resources of the terminal, the terminal can only start sensors relevant to the functional interface without starting sensors irrelevant to the functional interface when displaying the functional interface. Indeed, in practical implementations, the terminal may adaptively display the functional interface in other ways, such as playing a sound and transforming the functional interface, which are not described here redundantly.

Figure 4B:
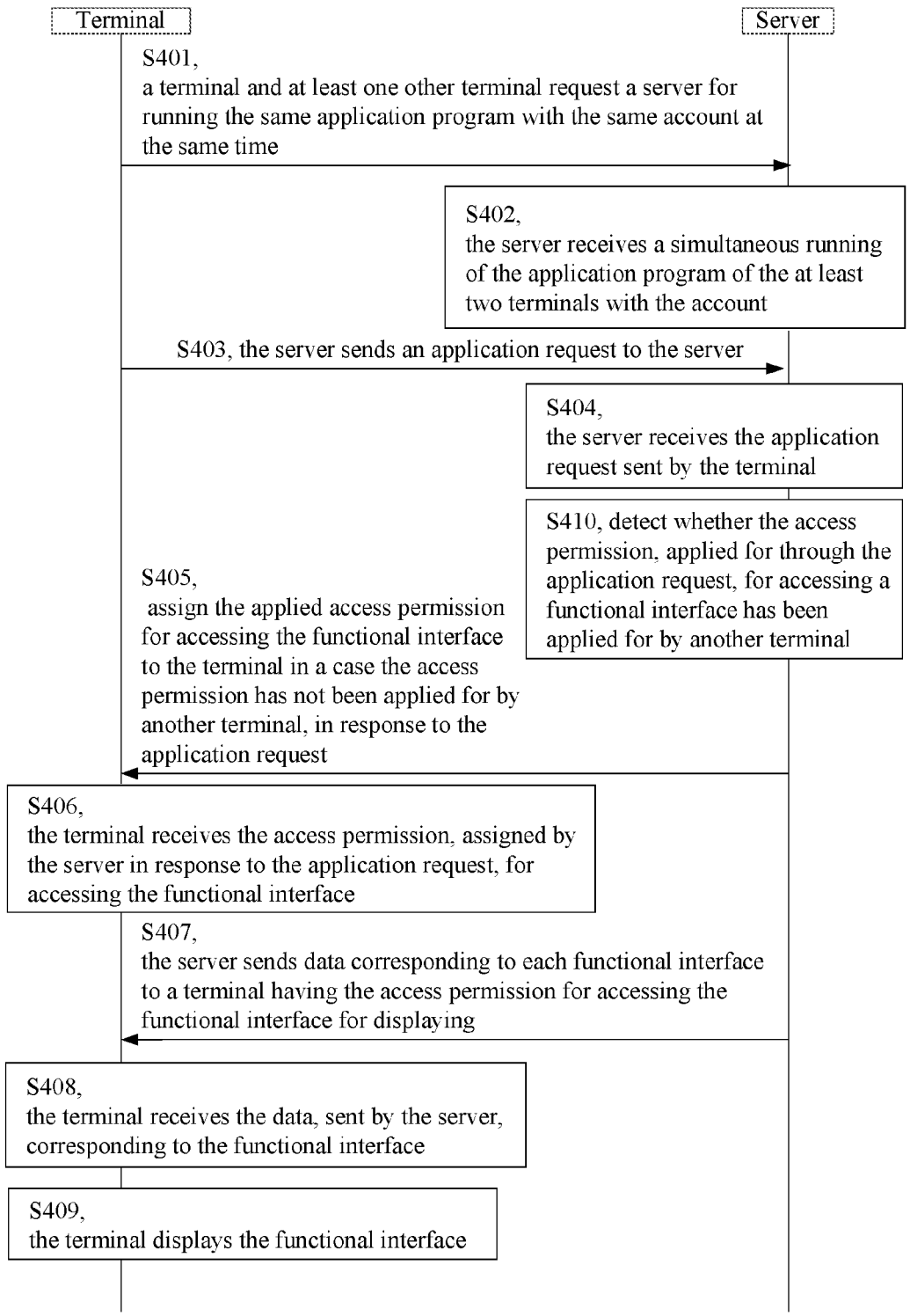
FIG. 4B is a flowchart of another method for displaying an interface according to the third embodiment of the invention.

Besides, in practical implementations two terminals may apply for an access permission for accessing one functional interface simultaneously. As shown in FIG. 4B, in order to avoid repeatedly sending information, the server may further perform the following steps S410 before assigning, in response to the application request, the access permission for accessing the at least one functional interface to the terminal, i.e., before step 405.

In step 410, it is detected whether the access permission, applied for through the application request, for accessing the at least one functional interface has been applied for by any other terminal.

After receiving the application request, the server may detect whether the access permission, applied for through the application request, for accessing the at least one functional interface has been applied for by any other terminal. For example, after receiving an application request, sent by the cellphone, for applying for the access permission for accessing the private message interface, the server may detect whether the laptop computer or the desktop computer sharing the same account as the cellphone has applied for the access permission for accessing the private message interface.

In a case a result of the detecting is that the access permission has not been applied for by any other terminal, the step of assigning the applied access permission for accessing the at least one functional interface to the terminal in response to the application request is performed.

In a case a result of the detecting by the server is that the access permission has not been applied for by any other terminal, the server may perform the step of assigning the applied access permission for accessing the at least one functional interface to the terminal in response to the application request.

In a case a result of the detecting is that the access permission has been applied for by another terminal, prompt information is sent to the terminal sending the application request.

In a case a result of the detecting by the server is that the access permission has been applied for by another terminal, the server may send prompt information to the terminal in order to avoid repeatedly sending information. Correspondingly, the terminal receives the prompt information sent by the server, where the prompt information is sent by the server on detecting the at least one functional interface applied for through the application request has been applied for by another terminal. After receiving the prompt information, the terminal may perform a corresponding operation in response to the prompt information. Specifically, the terminal may apply for an access permission for accessing another of the functional interfaces provided by the application program, or determine whether to have the access permission for accessing the at least one functional interface in replacement of the another terminal.

The prompt information is used to prompt for applying for an access permission for accessing another of the functional interfaces provided by the application program, or prompt for determining whether to let the terminal have the access permission for accessing the at least one functional interface in replacement of the another terminal.

In summary, in the method for displaying an interface according to the embodiment, access permissions for accessing different functional interfaces are assigned to terminals which simultaneously use an application program with the same account, and data corresponding to each of the functional interfaces is only assigned to a terminal having an access permission for accessing the functional interface, instead of assigning the data corresponding to each of the functional interfaces to all the terminals running the application program, thereby addressing the issue that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has an access permission, rather than receives data corresponding to all the functional interfaces provided by the application program, a user can directly view a functional interface in a terminal having an access permission therefore when accessing the functional interface without frequent switching operations, thereby reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

In the embodiment, the terminal sends the application request for applying for the access permission for accessing the at least one functional interface for itself to the server, so that the server may assign the access permission to the terminal in response to the application request received, achieving the objective that the terminal may display an interface according to use requirements of itself.

In addition, according to the embodiment, the functional interface may be displayed adaptively, achieving the effect that the user can view the contents in the functional interface more conveniently.

Fourth Embodiment

Figure 5A:
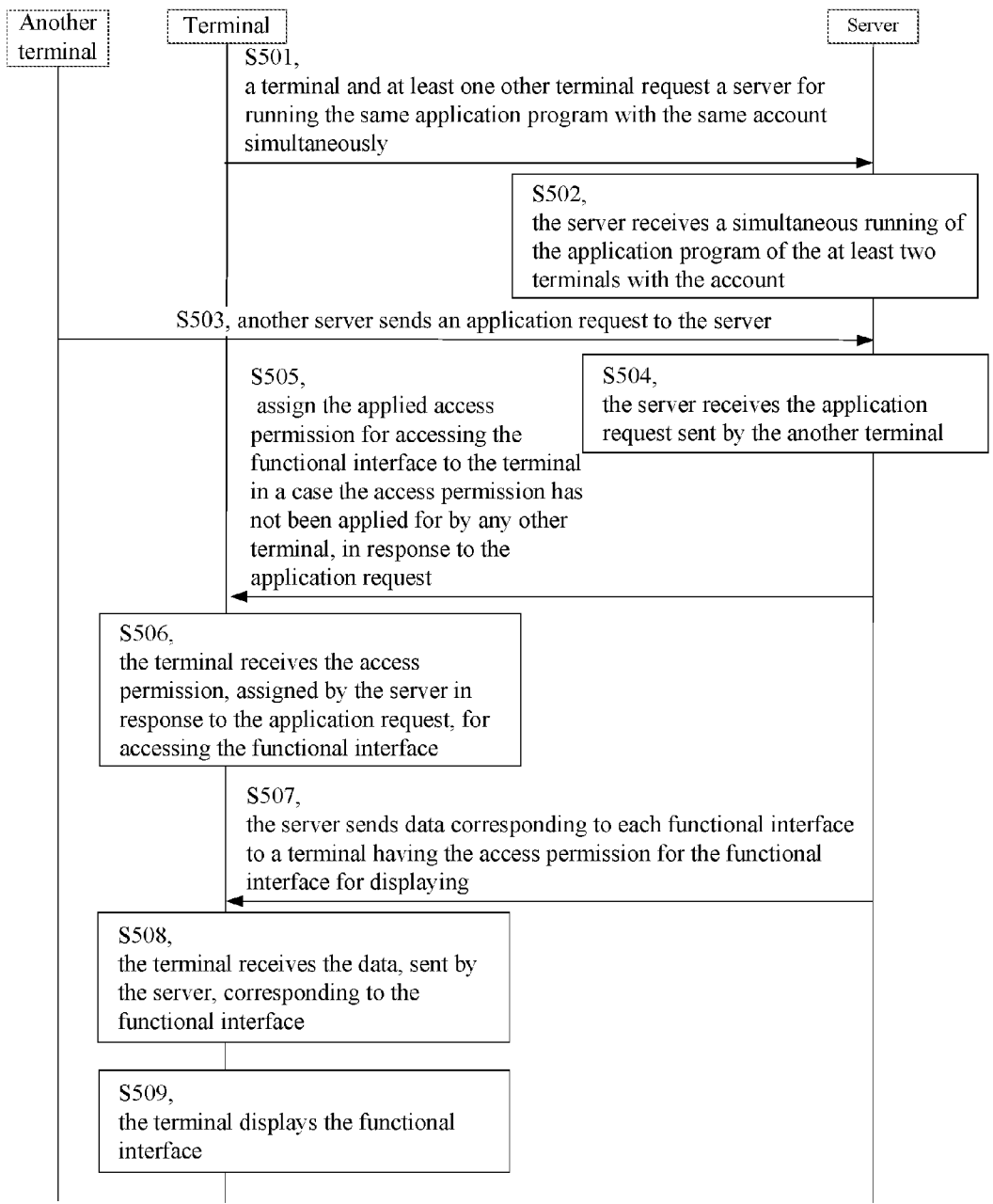
FIG. 5A is a flowchart of a method for displaying an interface according to a fourth embodiment of the invention.

Reference is made to FIG. 5A, which shows a flowchart of a method for displaying an interface according to the fourth embodiment of the invention. In the embodiment, the method for displaying an interface is applied in the implementation environment shown in FIG. 1, for example. In the method for displaying an interface, a server assigns an access permission for accessing at least one functional interface to a terminal in response to an application request after receiving the application request. The embodiment differs from the third embodiment only in that the application request for applying for the access permission for accessing the at least one functional interface for the terminal is sent by another of at the least two terminals, where the server then assigns the access permission to the terminal in response to the application request received. The method for displaying an interface may include steps 501 to 509.

In step 501, a terminal and at least one other terminal simultaneously request a server for running the same application program with the same account.

A user may request a server corresponding to an application program for running the application program with an account in a terminal. In practical implementations, in a case the user has multiple terminals, the user may request the server for running an application program with same account in at least two terminals simultaneously. For example, in a case the application program is microblog and the user has a cellphone, a laptop computer and a desktop computer, the user may log in to microblog in the laptop computer, cellphone and desktop computer with one microblog account.

In step 502, the server receives a simultaneous running of the application program of the at least two terminals with the one account.

Correspondingly, the server may receive a simultaneous running of the application program of the at least two terminals with the account.

In step 503, another terminal sends an application request to the server.

In a case the terminal and the at least one other terminal simultaneously access the application program with the same account, the terminal may send an application request for another terminal. Similarly, another terminal may send an application request for applying for an access permission for accessing at least one functional interface for the terminal to the server. In a case the user runs the application program with the same account through the at least two terminals, the user may set one of the at least two terminals as a multifunction terminal, and register terminal information of the others in the multifunction terminal, such that the multifunction terminal may send an application request for other terminals. The application request is used to apply for the access permission for accessing the at least one functional interface for the terminal.

Figure 5B:
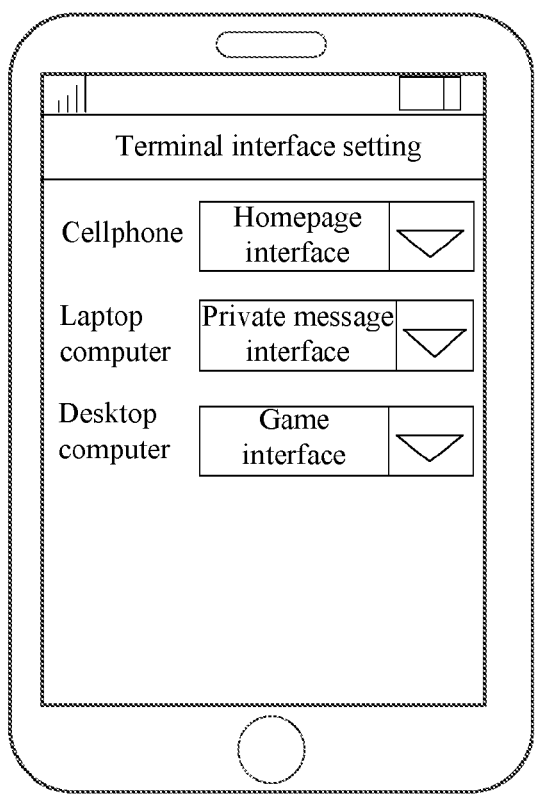
FIG. 5B is a schematic diagram of a display interface of a terminal when sending an application request for other terminals according to the fourth embodiment of the invention.

For example, in a case the user logs in to microblog in the cellphone, the laptop computer and the desktop computer simultaneously, and sets the cellphone as the multifunction terminal, the user may simultaneously send application requests for the three terminals, i.e., the cellphone, the laptop computer and the desktop computer, as illustrated in FIG. 5B for details. For the laptop computer and the desktop computer, an application request for applying a user permission for a functional interface is sent by another terminal, i.e., the cellphone.

In step 504, the server receives the application request sent by the another terminal.

After the another terminal sends the application request to the server, the server may receive the application request sent by the terminal accordingly.

In step 505, the server assigns the applied access permission for accessing the at least one functional interface to the terminal, in response to the application request.

After receiving the application request sent by the another terminal, the server may assign the applied access permission for accessing the at least one functional interface to the terminal, in response to the application request. For example, in a case the server receives an application request sent by the cellphone for applying for the access permission for accessing the private message interface for the laptop computer, the server may assign the access permission for accessing the private message interface to the laptop computer.

It should be noted that a conventional method for a terminal to apply for running an application program is described herein. The terminals each send a login request to the server. The server returns contents in a main interface to each terminal after receiving the login request the user performs a certain operation on the main interface to guide the each terminal to each functional interface after the terminal displays the contents in the main interface. Hence, the server may assign an access permission for accessing the main interface to multiple terminals simultaneously when the terminals are accessing the application program. After receiving the application request sent by the another terminal, the server assigns the access permission, applied for through the application request, for the at least one functional interface to the terminal, and an access permission for accessing each functional interface is only assigned to one terminal at a specific time, which is not redundantly described in the embodiment.

In step 506, the terminal receives the access permission for accessing the at least one functional interface assigned by the server in response to the application request.

Correspondingly, the terminal may receive the access permission for accessing the at least one functional interface assigned by the server in response to the application request.

In step 507, the server sends data corresponding to each functional interface to a terminal having an access permission for accessing the functional interface for display.

After assigning the access permission for accessing the at least one functional interface to each of the at least two terminals, the server may send data corresponding to each functional interface to a terminal having an access permission for accessing the functional interface for display. For example, in a case the server assigns the access permission for accessing the private message interface to the cellphone, assigns an access permission for accessing a homepage interface to the laptop computer and assigns access permissions for accessing the other functional interfaces provided by microblog to the desktop computer, the server may send a private message only to the cellphone without sending the private message to the laptop computer or the desktop computer when needing to sending the private message to a terminal logging in with the account. Since the private message is sent only to the cellphone having the access permission but is not sent to the laptop computer or the desktop computer, disturbance brought in to the laptop computer and the desktop computer when the private message arrives at the laptop computer and the desktop computer can be avoided. In addition, since the server sends the data to the terminal having an access permission for accessing a corresponding functional interface, the problem that the consumption of network traffic of each terminal is large in a case one message is sent to multiple terminals can be avoided.

In step 508, the terminal receives the data corresponding to the functional interface.

After the server sends the data corresponding to the functional interface to the terminal having the access permission for accessing the functional interface, the terminal may receive the data corresponding to the functional interface sent by the server, where the data corresponding to the functional interface is sent to the terminal having the access permission for accessing the functional interface by the server.

In step 509, the terminal displays the functional interface.

After receiving the data corresponding to the functional interface sent by the server, the terminal may display the functional interface. For example, in a case the cellphone receives a private message sent by the server, the cellphone may display the private message interface. Since the terminal only receives the data corresponding to the functional interface for which the terminal has the access permission, without receiving data corresponding to all functional interfaces provided by the application program, the network traffic consumed by the terminal can be greatly reduced. In addition, the terminal only displays the functional interface for which the terminal has the access permission, without displaying all the functional interfaces, so that when the user needs to view a specified functional interface, the user may directly view the specified functional interface in a terminal having an access permission, without switching between interfaces in the terminal, simplifying operations for the user.

The step that the terminal displays the functional interface may include at least one of the following two.

A first one includes displaying the functional interface in which data irrelevant to the functional interface has been filtered out.

In a first possible implementation, in order that only data of interest to the user is included in the functional interface displayed in the terminal, the terminal may display the functional interface in which data irrelevant to the functional interface has been filtered out. The data irrelevant to the functional interface may be an advertisement in the functional interface or data for guiding the user to another functional interface. For example, in a case the data irrelevant to the functional interface is an advertisement, in order to prevent the advertisement from disturbing the user and thus improve the user experience, the terminal may display the functional interface in which the advertisement has been filtered out.

A second one includes displaying the functional interface which has been zoomed in by a predetermined scale.

In a second possible implementation, for ease of viewing of the user, the terminal may display the functional interface which has been zoomed in by a predetermined scale.

It should be noted that in order to reduce the occupation of resources of the terminal, the terminal may start only sensors relevant to the functional interface without starting sensors irrelevant to the functional interface when displaying the functional interface. Indeed, in practical implementations, the terminal may adaptively display the functional interface in other ways, such as playing a sound and transforming the functional interface, which are not described here redundantly.

Besides, as similar to the third embodiment, in practical implementations two terminals may apply for an access permission for accessing one functional interface simultaneously. In order to avoid repeatedly sending information, the server may further perform step 510 before assigning, in response to the application request, the access permission for accessing the at least one functional interface to the terminal, i.e., before performing step 505.

In step 510, it is detected whether the access permission, applied for through the application request, for accessing the at least one functional interface has been applied for by any other terminal.

After receiving the application request, the server may detect whether the access permission, applied for through the application request, for accessing the at least one functional interface has been applied for by any other terminal. For example, after receiving an application request, sent by the cellphone, for applying for the access permission for accessing the private message interface, the server may detect whether the laptop computer or the desktop computer sharing the same account as the cellphone has applied for the access permission for accessing the private message interface.

In a case a result of the detecting is that the access permission has not been applied for by any other terminal, the step of assigning the applied access permission for accessing the at least one functional interface to the terminal in response to the application request is performed.

In a case a result of the detecting by the server is that the access permission has not been applied for by any other terminal, the server may perform the step of assigning the applied access permission for accessing the at least one functional interface to the terminal in response to the application request.

In a case a result of the detecting is that the access permission has been applied for by another terminal, prompt information is sent to a terminal sending the application request.

In a case a result of the detecting by the server is that the access permission has been applied for by another terminal the server may send prompt information to the another terminal which sends the application request in order to avoid repeatedly sending information. Correspondingly, the terminal receives the prompt information sent by the server, where the prompt information is sent by the server on detecting that the at least one functional interface applied for through the application request has been applied for by another terminal. After receiving the prompt information, the another terminal which sends the application request may perform a corresponding operation in response to the prompt information. Specifically, the another terminal which sends the application request may send an application request for applying for an access permission for accessing another of the functional interfaces provided by the application program, or determine whether to let the terminal have the access permission for accessing the at least one functional interface in replacement of another terminal.

The prompt information is used to prompt for applying for an access permission for accessing another of the functional interfaces provided by the application program, or prompt for determining whether to let the terminal have the access permission for accessing the at least one functional interface in replacement of the another terminal.

In summary, in the method for displaying an interface according to the embodiment, access permissions for accessing different functional interfaces are assigned to terminals which simultaneously run an application program with the same account, and data corresponding to each of the functional interfaces is only assigned to a terminal having an access permission for accessing the functional interface, instead of assigning the data corresponding to each of the functional interfaces to all the terminals running the application program, thereby addressing the issue that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has an access permission, rather than receives data corresponding to all the functional interfaces provided by the application program, a user can directly view a functional interface in a terminal having an access permission therefore when accessing the functional interface without frequent switching operations, thereby reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

In the embodiment, the application request for applying for the access permission for accessing the at least one functional interface for the terminal is sent to the server by another terminal, so that the server may assign the access permission to the terminal in response to the application request received, achieving the objective that the terminal may display an interface according to use requirements of itself.

In addition, according to the embodiment, the functional interface may be displayed adaptively, achieving the effect that the user can view the contents in the functional interface more conveniently.

It should be noted in the embodiment above, the main interface is not assigned, for example. In practical implementations, the server may assign an access permission for accessing the main interface to a certain terminal in the assigning rule above. Since the access permission for accessing the main interface has been assigned to a certain terminal, other terminals can not obtain data corresponding to the main interface or display the main interface in a case the other terminals request accessing the application program with the same account. Under this circumstance, the other terminals each may display a last functional interface for which an access permission is provided, a specified functional interface, a most time functional interface or a functional interface, which has not been applied for by any other terminal, of the functional interfaces provided by the application program, which is not limited in the embodiment. In addition, in practical implementations, the server may assign the access permission for accessing the main interface only to a specified one of the terminals, such that only the specified terminal can display the main interface and the other terminals are not authorized to display the main interface, thereby achieving controlling the display permission for the main interface.

Figure 6A:
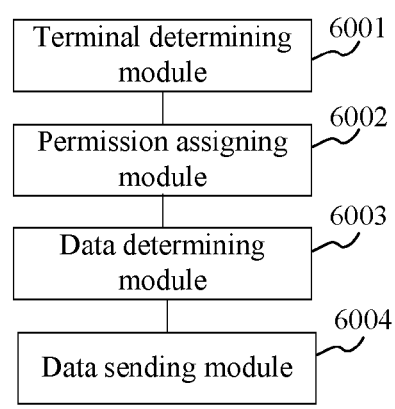
FIG. 6A is a block diagram of the structure of a server according to an embodiment of the invention.

As shown in FIG. 6A, a server according to an embodiment of the invention includes a terminal determining module 6001, a permission assigning module 6002, a data determining module 6003, and a data sending module 6004.

a terminal determining module 6001 is configured to determine a first terminal and a second terminal currently running the same application program with the same account;

a permission assigning module 6002 is configured to assign an access permission for accessing at least one functional interface provided by the application program to the first terminal and the second terminal, where an available functional interface assigned to the first terminal is distinct at least in part from that assigned to the second terminal;

a data determining module 6003 is configured to determine data related to the available functional interface of the first terminal and that of the second terminal, respectively; and a data sending module 6004 is configured to send the data to the first terminal and the second terminal, respectively, based on the available functional interface of the first terminal and that of the second terminal.

The data determining module 6003 is further configured to receive update data of the application program and determine a functional interface related to the update data, and the data sending module 6004 is further configured to send the update data to a terminal having an access permission for accessing the functional interface related.

Fifth Embodiment

Figure 6B:
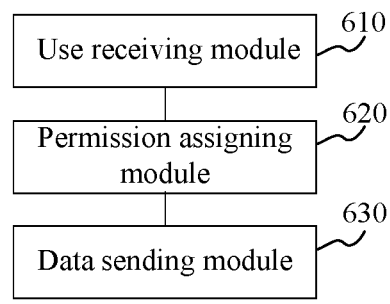
FIG. 6B is a block diagram of the structure of a server according to a fifth embodiment of the invention.

Reference is made to FIG. 6B, which shows a block diagram of the structure of a server according to the fifth embodiment of the invention, where the server may be in the form of software, hardware or a combination of both. The server may include: a use receiving module 610, a permission assigning module 620 and a data sending module 630.

The use receiving module 610 is configured to receive a simultaneous running of the application program of at least two terminals with the same account.

The permission assigning module 620 is configured to assign an access permission for accessing at least one functional interface provided by the application program to the at least two terminals, where a functional interface assigned to each of the at least two terminals is distinct from a functional interface assigned to any other of the at least two terminals.

And the data sending module 630 is configured to send data corresponding to each functional interface to a terminal having an access permission for accessing the functional interface.

In a first possible implementation of the embodiment, the permission assigning module is further configured to:
receive an application request sent by each of the at least two terminals, where the application request is used to apply for the access permission for accessing the at least one functional interface for each of the at least two terminals, and assign, in response to the application request, the access permission, applied for, for the at least one functional interface to each of the at least two terminals; or receive an application request sent by another of the at least two terminals, where the application request is used to apply for the access permission for accessing the at least one functional interface for each of the at least two terminals, and assign, in response to the application request, the access permission, applied for, for accessing the at least one functional interface to each of the at least two terminals; or automatically assign an access permission for accessing a predetermined functional interface to each of the at least two terminals; or automatically assign an access permission, applied for by each of the at least two terminals last time, for accessing a functional interface to each of the at least two terminals; or automatically assign an access permission for accessing a functional interface most used before by each of the at least two terminals to each of the at least two terminals; or assign an access permission for accessing a functional interface which has not been applied for by any other terminal, to each of the at least two terminals, in a case the each of the at least two terminals is a default terminal.

In a second possible implementation of the embodiment, the permission assigning module is further configured to: detect whether the access permission, applied for through the application request, for accessing the at least one functional interface has been applied for by any other terminal; and perform the step of assigning, in response to the application request, the access permission, applied for, for accessing the at least one functional interface to each of the at least two terminals, in a case a result of the detecting is that the access permission has not been applied for by any other terminal.

In a third possible implementation of the embodiment, the permission assigning module is further configured to send prompt information to a terminal which the application request is from, in a case a result of the detecting is that the access permission has been applied for by another terminal, where the prompt information is used to prompt for applying for an access permission for accessing another of the functional interfaces provided by the application program, or prompt for determining whether to let each of the at least two terminals have the access permission for accessing the at least one functional interface in replacement of the another terminal.

In summary, in the server according to the embodiment, access permissions for accessing different functional interfaces are assigned to terminals which simultaneously runs the same application program with the same account, and data corresponding to each of the functional interfaces is only assigned to a terminal having an access permission for accessing the functional interface, instead of assigning the data corresponding to each of the functional interfaces to all the terminals accessing the application program, thus solving the problem that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has an access permission, rather than receives data corresponding to all the functional interfaces provided by the application program, a user can directly view a functional interface in a terminal having an access permission therefore when accessing the functional interface without frequent switching operations, thus reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

Figure 7A:
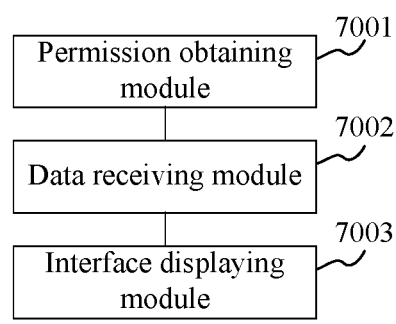
FIG. 7A is a block diagram of the structure of an apparatus for displaying an interface according to an embodiment of the invention.

As shown in FIG. 7A, an apparatus for displaying an interface, applied in a first terminal, is provided according to an embodiment of the invention, where the first terminal and a second terminal run the same application program with the same account. The interface display apparatus includes:

a permission obtaining module 7001, configured to obtain an access permission, assigned by a server, for accessing at least one functional interface provided by the application program, where an available functional interface assigned to the first terminal is distinct at least in part from that assigned to the second terminal;

a data receiving module 7002, configured to receive data related to the available functional interface of the first terminal from the server; and an interface displaying module 7003, configured to display the available functional interface based on the data.

Sixth Embodiment

Figure 7B:
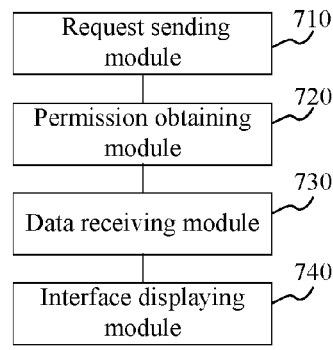
FIG. 7B is a block diagram of the structure of an apparatus for displaying an interface according to a sixth embodiment of the invention.

Reference is made to FIG. 7B, which shows a block diagram of the structure of an apparatus for displaying an interface according to the sixth embodiment of the invention. The apparatus for displaying an interface may compose the entire or a part of a terminal in form of software, hardware or a combination of both. And the apparatus for displaying an interface may include: a request sending module 710, a permission obtaining module 720, a data receiving module 730 and an interface displaying module 740.

The request sending module 710 is configured to request a server for running an application program with at least one other terminal with the same account simultaneously;

the permission obtaining module 720 is configured to obtain an access permission, assigned by the server, for accessing at least one functional interface provided by the application program, where the at least one functional interface is distinct from a functional interface assigned to the at least one other terminal;

the data receiving module 730 is configured to receive data, sent by the server, corresponding to the at least one functional interface, where the data corresponding to the at least one functional interface is sent to a terminal having the access permission for accessing the at least one functional interface by the server; and the interface displaying module 740 is configured to display the at least one functional interface.

In a first possible implementation of the embodiment, the permission obtaining module is configured to send an application request to the server, and receive the access permission, assigned by the server in response to the application request, for accessing the at least one functional interface, where the application request is used to apply for the access permission for accessing the at least one functional interface for the terminal; or receive the access permission, assigned by the server in response to an application request, for accessing the at least one functional interface, where the application request is sent by the at least one other terminal for applying for the access permission for accessing the at least one functional interface for the terminal; or receive an access permission, automatically assigned by the sever, for accessing a predetermined functional interface; or receive an access permission applied for by the terminal last time, automatically assigned by the sever, for accessing a functional interface; or receive an access permission, automatically assigned by the server, for accessing a functional interface most used before by the terminal; or receive an access permission, assigned by the server, for accessing a functional interface which has not been applied for by the at least one other terminal, in a case the terminal is a default terminal.

In a second possible implementation of the embodiment, the apparatus further includes:

an information receiving module, configured to receive prompt information sent by the server, where the prompt information is sent by the server on detecting the at least one functional interface applied for through the application request has been applied for by another terminal; and a permission requesting module, configured to apply for an access permission for accessing another of functional interfaces provided by the application program, or determine whether to have the access permission for accessing the at least one functional interface in replacement of the at least one other terminal.

In a third possible implementation of the embodiment, the permission obtaining module is further configured to receive a trigger signal for triggering applying for the access permission for accessing the at least one functional interface, and send the application request to the server after receiving the trigger signal; or automatically send the application request to the server in a case the terminal displays one of the at least one functional interface.

In a fourth possible implementation of the embodiment, the interface displaying module includes:

a first displaying unit and a second displaying unit.

The first displaying unit is configured to display the at least one functional interface in which data irrelevant to the at least one functional interface in the at least one functional interface has been filtered out.

And the second displaying unit is configured to display the at least one functional interface which has been zoomed in by a predetermined scale.

In summary, in the apparatus for displaying an interface according to the embodiment, access permissions for accessing different functional interfaces are assigned to terminals which simultaneously run the same application program with the same account, and data corresponding to each of the functional interfaces is only assigned to a terminal having an access permission for accessing the functional interface, instead of assigning the data corresponding to each of the functional interfaces to all the terminals accessing the application program, thus solving the problem that the consumption of network traffic is large in conventional technology and reducing the network traffic occupied in assigning the data corresponding to different functional interfaces to the terminals. Besides, since the data corresponding to each of the functional interfaces is only assigned to the terminal having the access permission, i.e., each of the terminal only receives data corresponding to a part of the functional interfaces, for which the terminal has an access permission, rather than receives data corresponding to all the functional interfaces provided by the application program, a user can directly view a functional interface in a terminal having an access permission therefore when accessing the functional interface without frequent switching operations, thus reducing an operational complexity for the user. In addition, since the server only assigns the data corresponding to each of the functional interfaces to the terminal having the access permission, disturbance brought in by the terminal simultaneously reminding the user when the server returns data to the terminals can be avoided.

Figure 8:
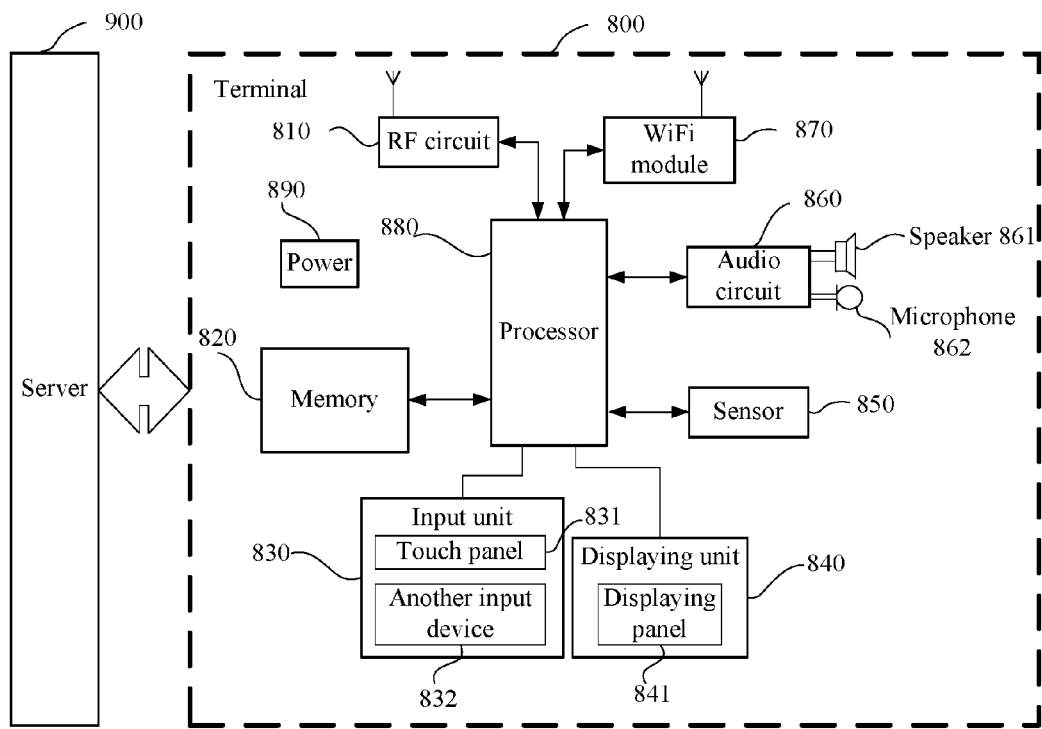
FIG. 8 is a structural diagram of the hardware of a terminal according to an embodiment of the invention.

FIG. 8 shows a structural diagram of the hardware of a terminal according to an embodiment of the invention. As shown in FIG. 8, only components relevant to the embodiments according to the present disclosure are shown for ease of description, and reference can be made to the method embodiments according to the present disclosure for unrevealed technical details. The terminal may be any of a cellphone, a tablet computer, a personal digital assistant (Personal Digital Assistant, PDA), a point of sales (Point of Sales, POS) and an on-board computer.

A server 900 is shown in FIG. 8 as well, and it is understood that the server 900 is not a part of the terminal.

As shown in FIG. 8, the terminal includes: a radio frequency (Radio Frequency, RF) circuit 810, a memory 820, an input unit 830, a displaying unit 840, a sensor 850, an audio circuit 860, a wireless fidelity (Wireless Fidelity, WiFi) module 870, a processor 880 and a power 890. Those in the art can understand the structure of the terminal illustrated in FIG. 8 is not construed as limiting the terminal, which may include more or less components than illustrated in FIG. 8, include combinations of some of components or have a different component arrangement.

The components included in the terminal are described in detail in conjunction with FIG. 8.

The RF circuit 810 may be configured to receive and send a signal in the process of receiving and sending information or calling, particularly, receiving downlink information of a base station and transferring the downlink information to the processor 880 to process; and, in addition, send uplink-related data to the base station. Generally, the RF circuit includes but is not limited to only include an antenna, at least one amplifier, a transceiver, a coupler, an low noise amplifier (Low Noise Amplifier) and a duplexer. Besides, the RF circuit 810 may communicate with another device through a wireless communications network. The wireless communications network may adopt any communications standard or protocol, which includes but is not limited to global system of mobile communication (Global System of Mobile communication, GSM), general packet radio service (General Packet Radio Service, GPRS), code division multiple access (Code Division Multiple Access, CDMA), wideband code division multiple access (Wideband Code Division Multiple Access, WCDMA), long term evolution (Long Term Evolution, LTE), e-mail and short messaging service (Short Messaging Service, SMS).

The memory 820 may be configured to store software programs and modules, and the processor 880 performs various functional applications and data processing by running the software programs and modules stored in the memory 820. The memory 820 may mainly include a program storage zone and a data storage zone, where operating systems, applications programs required by at least one function (such as an audio playing function and an image playing function) may be stored in the program storage zone and data (such as audio data and a phone directory) created in the usage of the terminal may be stored in the data storage zone. Besides, the memory 820 may include a high-speed random access memory, and further include a nonvolatile memory, such as at least one magnetic disk memory, a flash memory or any other nonvolatile solid memory.

The input unit 830 may be configured to receive inputted figures or character information and generate a keyboard signal input related to user setting and function control of the terminal 800. The input unit 830 may include a touch panel 831 and another input device 832. The touch panel 831, also called a touch screen, can collect an operation thereon or nearby (for example, an operation of a user with any appropriate object or accessory such as a finger or a touch pen on or near the touch panel 831) and drive a corresponding connection device according to a preset procedure. Optionally, the touch panel 831 may include a touch detecting apparatus and a touch controller. The touch detecting apparatus detects a position of a touch operation by a user and a signal brought in by the touch operation, and sends the signal to the touch controller. The touch controller receives touch information from the touch detecting apparatus, converts the touch information into a coordinate of a touch point, sends the coordinate of the touch point to the processor 880, and receives and executes a command from the processor 880. Besides, the touch panel 831 may include various types of touch panels, such as a resistive touch panel, a capacitive touch panel, an infrared touch panel and a surface acoustic wave touch panel. In addition to the touch panel 831, the input unit 830 may further include another input device 832. The another input device 832 may include but is not limited to one or more of a physical keyboard, a functional button (such as a volume control button and a switch button), a trackball, a mouse and an operating lever.

The displaying unit 840 may be configured to display information inputted by the user or provided for the user and various menus of the terminal. The display unit 840 may include a display panel 841 and optionally, the display panel 841 may be configured in the form of liquid crystal display (Liquid Crystal Display, LCD) or organic light-emitting diode (Organic Light-Emitting Diode, OLED). Further, the touch panel 831 may cover the display panel 841. After detecting a touch operation thereon or nearby, the touch panel 831 sends the touch operation to the processor 880 to determine a type of the touch event, and then the processor 880 provides a corresponding visual output on the display panel 841 according to the type of the touch event. Although, in FIG. 8, the touch panel 831 and the display panel 841 realize input and output functions of the terminal as two independent components, the touch panel 831 and the display panel 841 may be integrated together to realize the input and the output functions of the terminal in some embodiments.

The terminal 800 may further include at least one kind of sensors 850, such as a light sensor, a motion sensor and any other sensor. The light sensor may include an environmental light sensor and a proximity sensor. The environmental light sensor can adjust a lightness of the display panel 841 depending on a brightness of environmental light, and the proximity sensor can turn off a backlight of the display panel 841 when the terminal is moved close to an ear. As one kind of the motion sensor, an accelerometer sensor can detect values of accelerations in various directions (generally in three axes), and detect a value and a direction of gravity when being motionless, which can be applied to applications of recognizing a gesture of a cellphone (such as switching between landscape mode and portrait mode, related games and magnetometer calibration) and related functions of vibration recognition (such as a pedometer and a knock). Other sensors which may be included in the terminal, such as a gyroscope, a barometer, a hygrometer, a thermometer and an infrared sensor are not described herein redundantly.

The audio circuit 860, speaker 861 and microphone 862 can provide an audio interface between the user and the terminal. The audio circuit 860 can transmit an electrical signal converted from received audio data to the speaker 861, and the speaker 861 converts the electrical signal into an acoustical signal and outputs the acoustical signal. On the other hand, the microphone 862 converts a collected acoustical signal into an electrical signal; the audio circuit 860 receives the electrical signal, converts the electrical signal into audio data and sends the audio data to the processor 880; and after processing the audio data, the processor 880 sends the audio data to another terminal or outputs the audio data to the memory 820 for further processing.

Besides, the terminal can help the user receive and send e-mails, browse webpages and access streaming media with a wireless communications module, for example, the WiFi module 870 shown in FIG. 8, which provides an access to wireless boardband interne for the user. Though shown in FIG. 8, it is understood that the WiFi module 870 is not a necessary part of the terminal 800 and can be definitely omitted without deviating from the essence of the invention.

The processor 880 is the control center of the terminal 800, which connects all parts of the terminal through interfaces and circuits, performs the functions of the terminal 800 and processes data by running or executing the software programs or modules stored in the memory 820 and calling data stored in the memory 820, thereby realizing an overall monitoring on the terminal. Optionally, the processor 880 may include one or more processing units. Preferably, the processor 880 may be integrated with an application processor and a modulation/demodulation processor, where the application processor is mainly configured to process the operating systems, user interfaces and applications and the modulation/demodulation processor is mainly configured to process wireless communications. It is understood that the modulation/demodulation processor may not be integrated into the processor 880.

The terminal 800 further includes a power 890 (for example, a battery) to supply the components with power. Preferably, the power supply may be logically connected to the processor through a power management system, thereby realizing functions of managing charging and discharging and power consumption management with the power management system.

Though not shown, the terminal 800 may further include a camera or a Bluetooth module, which is not described herein redundantly. In the embodiment of the invention, the processor 880 included in the terminal has the following functions: obtaining an access permission, assigned by a server, for accessing at least one functional interface provided by an application, where an available functional interface assigned to a first terminal is distinct at least in part from that assigned to a second terminal; receiving data related to the available functional interface of the first terminal from the server; and displaying the available functional interface based on the data.

It should be noted that the division of the functional modules above in the apparatus for displaying an interface according to the embodiment above is only illustrated for example. In practical applications, the functions above may be assigned to different functional modules to realize as needed, i.e., the inner structure of the apparatus is divided into different functional modules, to realize all or a part of the functions described above. Besides, the apparatus and the method for displaying an interface according to the embodiments above fall within one idea, and reference can be made to the method embodiments for specific implementation processes of the apparatus, which is not described here redundantly.

Serial numbers of the embodiments above according the present disclosure are only used for description, rather than representing merits of the embodiments.

Those in the art shall understand that all or a part of the steps according to the embodiments above may be performed through hardware, or performed through related hardware under instructions of a program. The program may be stored in a computer readable storage medium, which may be a read-only memory, a magnetic disk or an optical disc.

The embodiments above are only some preferred embodiments of the invention and are not intended to limit the invention. Any modifications, equivalent substitutions or improvements made within the spirit and principle of the invention shall fall within the scope of the invention.

The invention claimed is:

1. A method for displaying an interface, comprising:
determining a first terminal and a second terminal, the first terminal and the second terminal currently running a same application program with a same account;
assigning respective access permission for accessing at least one functional interface provided by the application program to the first terminal and the second terminal, the assigned functional interface to the first terminal being distinct at least in part from the assigned functional interface assigned to the second terminal;
determining data related to the assigned functional interfaces of the first terminal and the second terminal; and
sending the data to the first terminal and the second terminal for displaying, the displaying based on the assigned functional interfaces of the first terminal and the second terminal.

2. The method according to claim 1, further comprising:
receiving update data of the application program;
determining a functional interface related to the update data; and
sending the update data to a terminal having an access permission for the related functional interface.

3. The method according to claim 1, wherein the assigning an access permission for accessing at least one functional interface provided by the application program to the first terminal and the second terminal comprises at least one of:
receiving an application request sent by the first terminal, the application request used to apply for the access permission for accessing the at least one functional interface for the first terminal, and assigning the applied access permission for accessing the functional interface in response to the application request;
receiving an application request sent by the second terminal, the application request used to apply for the access permission for accessing the at least one functional interface for the first terminal, and assigning the applied access permission for accessing the functional interface in response to the application request;
automatically assigning an access permission for accessing a predetermined functional interface to the first terminal or the second terminal;
automatically assigning an access permission applied for last time for accessing a functional interface to the first terminal or the second terminal;
automatically assigning a most time access permission for accessing a functional interface to the first terminal or the second terminal; and
assigning an access permission for accessing a functional interface which has not been applied for by the second terminal to the first terminal.

4. The method according to claim 3, wherein before the assigning of the applied access permission for accessing the functional interface in response to the application request, the method further comprises:
detecting whether the access permission for the functional interface, which is applied through the application request, has been applied for; and
performing to assign the applied access permission for accessing the functional interface in response to the application request, if the detecting result indicates that the access permission has not been applied for.

5. The method according to claim 4, further comprising:
sending prompt information to a terminal sending the application request if the detecting result indicates that the access permission has been applied for, the prompt information used to prompt for applying for an access permission for accessing another of functional interfaces provided by the application program or prompt for whether to assign the access permission for accessing the at least one functional interface to another terminal.

6. A server, comprising:
a terminal determining module, configured to determine a first terminal and a second terminal currently running a same application program with a same account;
a permission assigning module, configured to assign respective access permission for accessing at least one functional interface provided by the application program to the first terminal and the second terminal, the assigned functional interface to the first terminal being distinct at least in part from the assigned functional interface to the second terminal;
a data determining module, configured to determine data related to the assigned functional interfaces of the first terminal and the second terminal; and
a data sending module, configured to send the data to the first terminal and the second terminal for display, the displaying based on the assigned functional interfaces of the first terminal and the second terminal.

7. The server according to claim 6, wherein the data determining module is further configured to receive update data of the application program and determine a functional interface related to the update data, and the data sending module is further configured to send the update data to a terminal having an access permission for accessing the related functional interface.

8. The server according to claim 6, wherein the permission assigning module is further configured to perform at least one of:
receiving an application request sent by the first terminal, wherein the application request is used to apply for the access permission for accessing the at least one functional interface for the first terminal, and assigning the applied access permission for accessing the functional interface to the first terminal in response to the application request;
receiving an application request sent by the second terminal, wherein the application request is used to apply for the access permission for accessing the at least one functional interface for the first terminal, and assigning the applied access permission for accessing the functional interface to the first terminal in response to the application request;

automatically assigning an access permission for accessing a predetermined functional interface to the first terminal or the second terminal;

automatically assigning an access permission applied for last time for accessing a functional interface to the first terminal or the second terminal;

automatically assigning a most time access permission for accessing a functional interface to the first terminal or the second terminal; and assigning an access permission for accessing a functional interface which has not been applied for by the second terminal to the first terminal.

9. The server according to claim 8, wherein the permission assigning module is further configured to:

detect whether the access permission for accessing the functional interface, which is applied for through the application request, has been applied for; and perform to assigning the applied access permission for accessing the functional interface in response to the application request, if the detecting result indicates that the access permission has not been applied for.

10. The server according to claim 9, wherein the permission assigning module is further configured to:

send prompt information to a terminal sending the application request if the detecting result indicates that the access permission has been applied for, wherein the prompt information is used to prompt for applying for an access permission for accessing another of functional interfaces provided by the application program, or prompt for whether to assign the access permission for accessing the at least one functional interface to another terminal.

* * * * *